(12) United States Patent
Yu et al.

(10) Patent No.: US 12,519,819 B2
(45) Date of Patent: Jan. 6, 2026

(54) METHOD, DEVICE, AND COMPUTER PROGRAM PRODUCT FOR DETERMINING ACCESS PERMISSION OF HOST

(71) Applicant: Dell Products L.P., Round Rock, TX (US)

(72) Inventors: Ying Yu, Chengdu (CN); Jennifer Lifeng Zheng, Chengdu (CN); Robin Fei Wang, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 81 days.

(21) Appl. No.: 18/641,233

(22) Filed: Apr. 19, 2024

(65) Prior Publication Data
US 2025/0280028 A1    Sep. 4, 2025

(30) Foreign Application Priority Data
Feb. 29, 2024   (CN) .......................... 202410234679.4

(51) Int. Cl.
*H04L 9/40*     (2022.01)
(52) U.S. Cl.
CPC .......... *H04L 63/1433* (2013.01); *H04L 63/10* (2013.01)
(58) Field of Classification Search
CPC ............................ H04L 63/1433; H04L 63/10
USPC ...................................... 726/4; 709/224, 229
See application file for complete search history.

(56) References Cited

U.S. PATENT DOCUMENTS

| 11,595,386 | B2 * | 2/2023 | Yu | H04L 63/102 |
| 2007/0143827 | A1 * | 6/2007 | Nicodemus | H04L 63/102 726/2 |
| 2007/0283411 | A1 * | 12/2007 | Paramasivam | G06F 21/604 726/1 |
| 2014/0317677 | A1 * | 10/2014 | Vaidya | H04L 63/20 726/1 |
| 2021/0194883 | A1 * | 6/2021 | Badhwar | H04L 63/107 |
| 2022/0286474 | A1 * | 9/2022 | Kuppa | H04L 63/145 |

* cited by examiner

*Primary Examiner* — Liang Che A Wang
(74) *Attorney, Agent, or Firm* — Amin, Turocy & Watson, LLP (57) ABSTRACT

The described technology relates to determining an access permission of a host. An example method includes performing an access check by a storage server in response to receiving an access request from the host and acquiring security information associated with the host from a management server by the storage server in response to passing the access check. In addition, the method can include determining a risk score of the host by the storage server based on the security information and determining an access permission of the host by the storage server based on the risk score of the host and a risk threshold of the type of access. Beneficially, an accurate assessment of the risk of access of the host is achieved, which avoids security problems caused by the security risk of the host, while allowing the host to gain maximum access permission without compromising overall security.

20 Claims, 5 Drawing Sheets

METHOD, DEVICE, AND COMPUTER PROGRAM PRODUCT FOR DETERMINING ACCESS PERMISSION OF HOST

RELATED APPLICATION

The present application claims the benefit of priority to Chinese Patent Application No. 202410234679.4, filed Feb. 29, 2024, which application is hereby incorporated into the present application by reference herein in its entirety.

TECHNICAL FIELD

The present application relates to the field of data security and, more particularly, to a method, a device, and a computer program product for determining an access permission of a host.

BACKGROUND

According to the type of storage resources or sharing, default access permissions may be set for all hosts, or access permissions for certain hosts may be customized. The access permissions include: no access, read-only, read-only with root allowed, read/write, and read/write with root allowed.

The access permissions are used to protect data security during sharing/exporting. By setting IP addresses for specific network segments or hosts and assigning corresponding permissions, access to data can be restricted. If there is a security problem on a host, an attacker may use this as a starting point to acquire access permission to sensitive data on the sharing/exporting.

SUMMARY

Embodiments of the present application provide a method, a device, and a computer program product for determining an access permission of a host.

According to a first example embodiment of the present application, a method for determining an access permission of a host is provided, the method including: performing an access check by a storage server in response to receiving an access request from a host; acquiring security information associated with the host from a management server by the storage server in response to passing the access check; determining a risk score of the host by the storage server based on the security information; and determining an access permission of the host by the storage server based on the risk score of the host and a risk threshold of the type of access.

According to a second example embodiment of the present application, an electronic device is provided, comprising: at least one processor; and coupled to the at least one processor and having instructions stored thereon, wherein the instructions, when executed by the at least one processor, cause the electronic device to perform actions including: performing an access check by a storage server in response to receiving an access request from a host; acquiring security information associated with the host from a management server by the storage server in response to passing the access check; determining a risk score of the host by the storage server based on the security information; and determining an access permission of the host by the storage server based on the risk score of the host and a risk threshold of the type of access.

According to a third example embodiment of the present application, a computer program product is provided, the computer program product being tangibly stored on a non-volatile computer-readable medium and including machine-executable instructions, wherein the machine-executable instructions, when executed, cause a machine to perform actions including: performing an access check by a storage server in response to receiving an access request from a host; acquiring security information associated with the host from a management server by the storage server in response to passing the access check; determining a risk score of the host by the storage server based on the security information; and determining an access permission of the host by the storage server based on the risk score of the host and a risk threshold of the type of access.

It should be understood that the content described in this Summary is neither intended to limit key or essential features of the embodiments of the present disclosure, nor intended to limit the scope of the present disclosure. Other features of the present disclosure will become readily understood from the following description.

BRIEF DESCRIPTION OF THE DRAWINGS

The above and other features, advantages, and aspects of the embodiments of the present disclosure will become more apparent with reference to the accompanying drawings and the following detailed description. In the accompanying drawings, the same or similar reference numerals always represent the same or similar elements. In the accompanying drawings.

DETAILED DESCRIPTION

Embodiments of the present disclosure will be described in more detail below with reference to the accompanying drawings. Although the accompanying drawings show some embodiments of the present disclosure, it should be understood that the present disclosure may be implemented in various forms, and should not be explained as being limited to the embodiments stated herein. Rather, these embodiments are provided for understanding the present disclosure more thoroughly and completely. It should be understood that the accompanying drawings and embodiments of the present disclosure are for illustrative purposes only, and are not intended to limit the protection scope of the present disclosure.

In the description of the embodiments of the present disclosure, the terms "include," "have," and similar terms thereof should be understood as open-ended inclusion, that is, "including but not limited to." The term "based on" should be understood as "based at least in part on." The terms "embodiment," "one embodiment," or "this embodiment" should be understood as "at least one embodiment."

According to the type of storage resources or sharing, a storage device administrator can set default access permissions of all hosts or customize access permissions of certain hosts. The access permissions include: no access, read-only, read-only with root allowed, read/write, and read/write with root allowed.

The access permissions are used to protect data security during storage sharing/exporting. By setting IP addresses for specific network segments or hosts and assigning corresponding permissions, access to data by the hosts can be restricted. However, if there is a security problem on a host, an attacker may use this as a starting point to acquire access permission to sensitive data on the sharing/exporting. For this reason, an existing solution determines whether to allow a host to access data by calculating the overall risk level of the host.

However, this approach cannot accurately reflect the risk level of the host when accessing storage resources. This is because different types of access (e.g., reads and writes) may have different security risks (e.g., vulnerability risks and antivirus risks). For example, for reads, there is a risk of data leakage when the host reads a file on the storage sharing/exporting. For data protection purposes, unauthorized host access should be prohibited. For example, for writes, when an attacker puts a virus file into the storage sharing/exporting by exploiting vulnerabilities or security weaknesses (which would provide the attacker with an opportunity to access the data on the storage sharing/exporting), it could result in the spread of the virus file and threaten other hosts. In addition, the same security risk may have different degrees of harm to storage under different types of access. For example, if there is a risk that the host is not enabled for real-time scanning, the host will only harm the storage when performing a write operation and will not affect the storage when performing a read operation, and if there is a man-in-the-middle risk in the host, the host will only harm the storage when performing a read operation and will not affect the storage when performing a write operation.

It is desired to provide a new access policy for storage sharing/exporting that can avoid security problems caused by security risks (e.g., vulnerability risks and antivirus risks) of a host. At the same time, the host is allowed to maximize access without compromising the overall security.

To this end, the present disclosure provides a scheme for determining an access permission of a host. In embodiments of the present disclosure, for a host that passes an access check, security information associated with the host is acquired by a storage server from a management server, a risk score of the host is determined according to such security information, and finally, an access permission of the host is determined based on the comparison between this risk score and a risk threshold of the type of access. With this scheme, the security risk associated with access of the host to the stored files can be accurately assessed, which reduces the security problems caused by the security risk of the host and allows the host to gain the maximum access permission without compromising the overall security.

Figure 1:
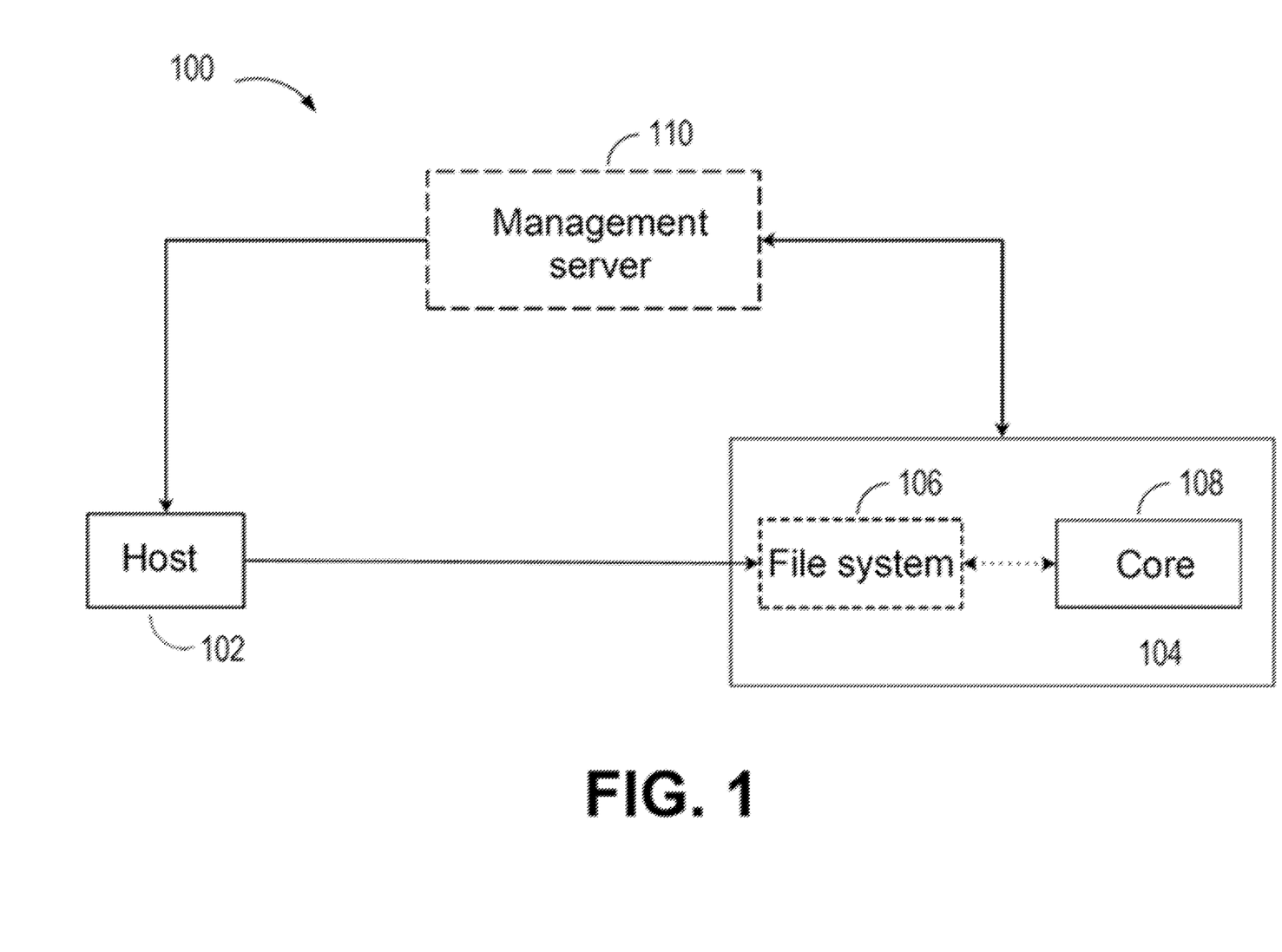
FIG. 1 illustrates a schematic diagram of an overall design for implementing secure access of a host according to some embodiments of the present disclosure.

FIG. 1 illustrates a schematic diagram of an environment 100 for implementing secure access of a host 102 according to some embodiments of the present disclosure. As shown in FIG. 1, the environment 100 includes a host 102, a storage server 104, and a management server 110. The storage server 104 includes a file system 106 and a core 108.

In some embodiments, as shown in FIG. 1, the host 102 sends an access request for the file system 106 to the storage server 104. The access request includes either of a read request and a write request or a combination thereof. In response to receiving the access request from the host 102, an access check is performed by the core 108 in the storage server 104. This access check is a preliminary check for the permission of the host 102, for checking either the customized access permission or the default access permission of the host 102. When an administrator has set a customized access permission for the host 102, this access check is performed only for the customized access permission of the host 102, because the customized access permission overrides the default access permission of the host 102. If the access permission is detected to be not no access, the host 102 passes the access check, otherwise, the host 102 will be denied access to the file system 106.

In some embodiments, in response to passing the access check, a request to acquire security information associated with the host 102 is sent by the core 108 in the storage server 104 to the management server 110. In some embodiments, the security information includes risk categories, risk sub-categories, vulnerability numbers, and common vulnerability scoring system (CVSS) scores of vulnerabilities. The risk category includes an antivirus risk and a vulnerability risk. The risk sub-categories include antivirus risk sub-categories and vulnerability risk sub-categories. The types of access affected by the risk sub-categories are not the same, and example impact situations are given in Table 1. In Table 1, "R" stands for read operations, and "W" stands for write operations. As can be seen, among the risk sub-categories, "Real-time scanning not enabled" and "Definitions not up-to-date" only affect write operations, "Man-in-the-middle" and "Packet sniffing" only affect read operations, and the remaining risk sub-categories affect both write and read operations.

TABLE 1

List of Risk Categories

| Risk Category | Risk Sub-category | Type of Access Affected |
|---|---|---|
| Antivirus | No antivirus software installed | RW |
|  | Real-time scanning not enabled | W |
|  | Definitions not up-to-date | W |
| Vulnerability | Elevation of permission | RW |
|  | Weak password | RW |
|  | Brute force attack | RW |
|  | Default credential | RW |
|  | Weak encryption | RW |
|  | Key management issues | RW |
|  | Man-in-the-middle (MitM) | R |
|  | Packet sniffing | R |
|  | Security misconfiguration | RW |

In response to the request from the storage server 104 for acquiring security information about the host 102, the management server 110 sends to the storage server 104 the security information associated with the host 102 that it has collected from the managed client software installed on the host 102. The managed client software may be installed on the host 102 in a managed or an unmanaged manner, and it may communicate with the management server 110 in the network.

Based on the acquired security information associated with the host 102, a risk score of the host 102 is calculated by the core 108 of the storage server 104. The risk score can accurately measure the risk level of the host 102 when accessing the storage sharing/exporting, which is stored locally by the core 108.

Based on the risk score of the host 102 and a risk threshold corresponding to the type of access, the access permission of the host 102 may be determined. The type of access includes either of write and read or a combination thereof. In some embodiments, when the risk score of the host 102 is greater than or equal to the risk threshold corresponding to the type of access, the host 102 will be denied access to the file system 106, while when the risk score of the host 102 is less than the risk threshold corresponding to the type of access, the host 102 will be authorized to access the file system 106.

In combination with the approach described in FIG. 1 and compared with conventional methods that cannot accurately assess the risk level of a host, the method of the present disclosure achieves an accurate assessment of the risk of access of a host, which avoids security problems caused by the security risk of the host, while allowing the host to gain the maximum access permission without compromising the overall security.

Figure 2:
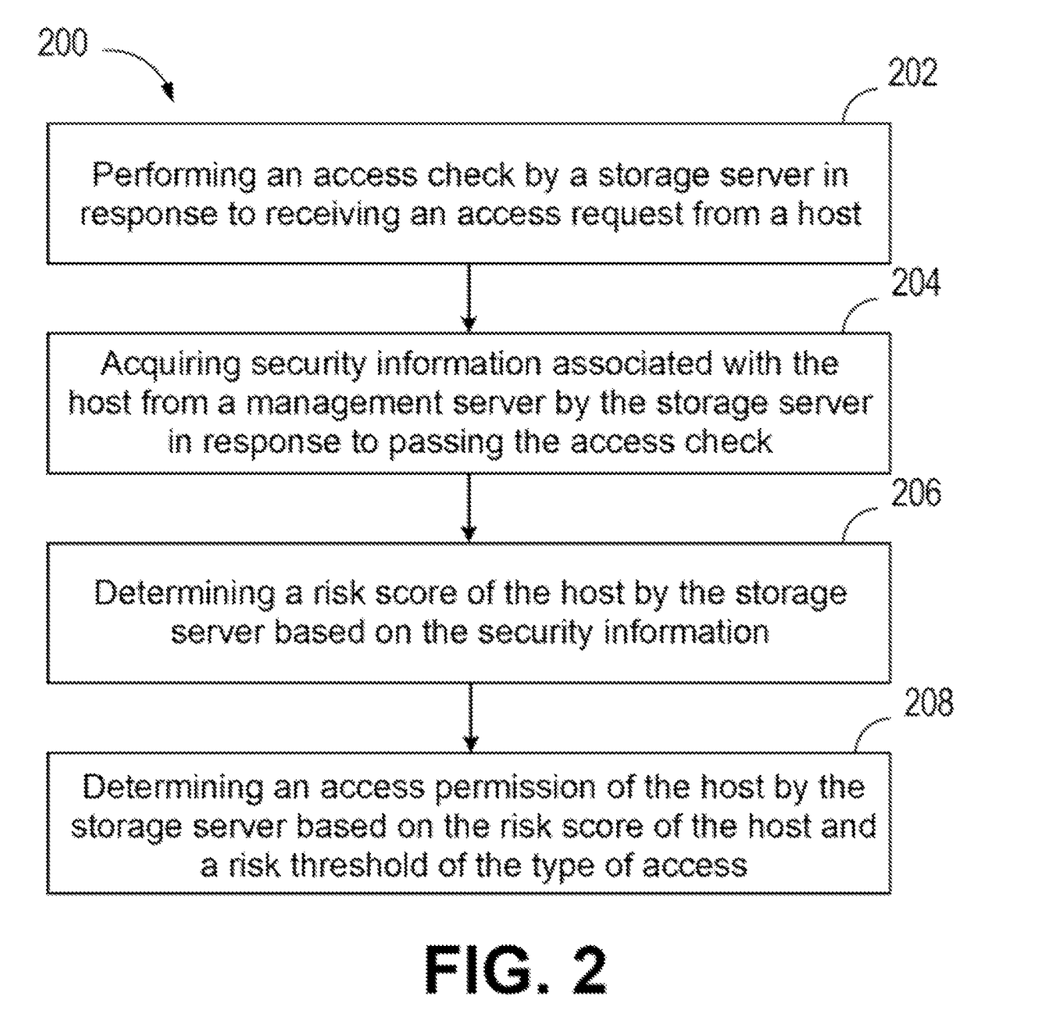
FIG. 2 illustrates a flow chart for determining an access permission of a host according to some embodiments of the present disclosure.

A flow chart for determining the access permission of a host 102 according to some embodiments of the present disclosure is described below in conjunction with FIG. 2. The method 200 may be performed in the environment 100 of FIG. 1. Furthermore, the numbering in the flow chart does not indicate the order in which these steps are performed, and some or all of these steps may be executed in parallel, or the execution order can be interchanged, which is not limited in the present disclosure.

In block 202, an access check is performed by a storage server in response to receiving an access request from the host. As an embodiment, the access request is a request by the host 102 for reading or writing, or a combination thereof, of the file system 106 in the storage server 104. The access check is a preliminary check for the permission of the host 102, which checks whether the host is prohibited from access, wherein if it is not prohibited from access, it passes the access check.

In block 204, security information associated with the host is acquired from a management server by the storage server in response to passing the access check. As an embodiment, a request for acquiring the security information associated with the host 102 is sent by the storage server 104 to the management server 110, and in response to the request from the storage server 104 for acquiring the security information about the host 102, the management server 110 sends the security information associated with the host 102 to the storage server 104.

In block 206, a risk score of the host is determined by the storage server based on the security information. As an embodiment, the risk score includes an antivirus risk score and a vulnerability risk score. The antivirus risk score is determined from the acquired antivirus-related security information, and the vulnerability risk score is determined from the acquired vulnerability-related security information. In some embodiments, the risk score of the host 102 is obtained by summing the antivirus risk score and the vulnerability risk score.

In block 208, an access permission of the host is determined by the storage server based on the risk score of the host and a risk threshold of the type of access. As an embodiment, in response to the risk score of the host 102 being greater than or equal to the risk threshold of the type of access, the access permission of the host 102 is denied; or in response to the risk score of the host 102 being less than the risk threshold of the type of access, the access permission of the host 102 is granted.

In the above manner, the risk level of the host when requesting storage sharing/exporting from the storage server is accurately assessed, which avoids the security problems caused by the security risk of the host and allows the host to gain the maximum access permission without compromising the overall security.

Figure 3:
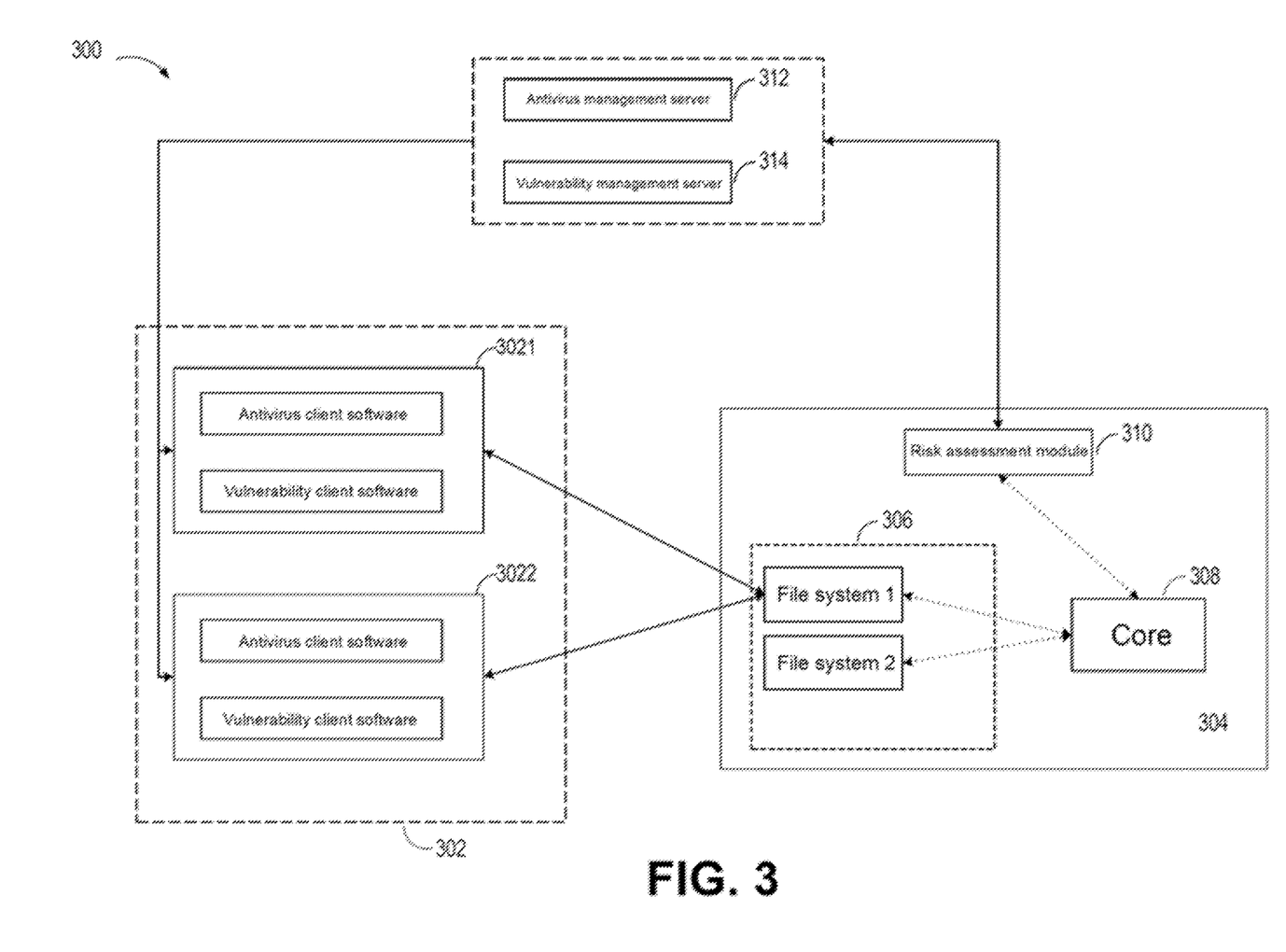
FIG. 3 illustrates a schematic diagram for implementing secure access of a plurality of hosts according to some embodiments of the present disclosure.

A schematic diagram of an environment 300 for implementing secure access of a plurality of hosts 302 according to some embodiments of the present disclosure is described below in conjunction with FIG. 3. As shown in FIG. 3, the environment 300 includes a plurality of hosts 302, a storage server 304, an antivirus management server 312, and a vulnerability management server 314. The plurality of hosts 302 include a host 3021, a host 3022, and the like, each of which is installed with antivirus client software and vulnerability client software (i.e., the managed client software described above). The storage server 304 includes a file system 306, a risk assessment module 310, and a core 308, wherein the file system 306 includes a file system 1, a file system 2, and the like.

In some embodiments, as shown in FIG. 3, the hosts 3021 and 3022 send access requests for the file system 1 to the storage server 304. The access request includes either of a read request and a write request or a combination thereof. In response to receiving the access requests from the hosts 3021 and 3022, access checks are performed by the core 308 in the storage server 304. The access checks are performed with respect to the access permissions of the hosts 3021 and 3022, and if it is detected that the access permissions of the hosts 3021 and 3022 are not no access, they pass the access check; otherwise, they will be denied access to the file system 1.

In some embodiments, in response to passing the access check, the risk assessment module 310 is run by the core 308 in the storage server 304 to determine the access permissions of the hosts 3021 and 3022. The risk assessment module 310 sends requests for security information associated with the hosts 3021 and 3022 to the antivirus management server 312 and the vulnerability management server 314. In response to the requests, the antivirus management server 312 and the vulnerability management server 314 send the requested security information associated with the hosts 3021 and 3022 to the risk assessment module 310. The following specifies how the antivirus management server 312 and the vulnerability management server 314 obtain the security information about the hosts 3021 and 3022.

In some embodiments, the antivirus management server 312 learns from the antivirus client software installed on the hosts 3021 and 3022 about whether the hosts 3021 and 3022 are well-protected by the antivirus client software, including whether they have the desired antivirus software installed, whether the antivirus definitions are up-to-date, whether the desired antivirus configurations (e.g., the "scanning the network drives") are enabled, and the like.

TABLE 2

| List of Vulnerabilities |
| --- |
| Elevation of permission |
| Weak password |
| Brute force attack |
| Default credential |
| Weak encryption |
| Key management issues |
| Man-in-the-middle (MitM) |
| Packet sniffing |
| Security misconfiguration |
| Buffer overflow |
| SQL injection |
| Cross-site scripting (XSS) |

TABLE 2-continued

List of Vulnerabilities

Cross-site request forgery (CSRF)
Command injection
Denial of service (DOS)
Distributed DoS (DDOS)

In some embodiments, the vulnerability management server 314 monitors the vulnerabilities of the hosts 3021 and 3022 through vulnerability client software installed on the hosts 3021 and 3022, which measures the risk levels of the hosts 3021 and 3022 through CVSS scores, with the CVSS scores being calculated according to the number of vulnerabilities and the severity of those vulnerabilities. Such CVSS scores indicate the risk levels of the hosts 3021 and 3022 in terms of vulnerabilities, but they do not accurately reflect their risk levels when accessing storage resources. The types of vulnerabilities monitored by the vulnerability management server 314 are given by Table 2, but not the CVSS score of every vulnerability in Table 2 is requested by the risk assessment module 310 because not all security vulnerabilities increase the security risk of accessing storage resources from the storage sharing/exporting perspective. For example, if a host has a denial of service (DoS)/distributed DoS (DDoS) vulnerability, when it accesses the storage sharing/exporting, it will not bring security problems to the storage resources regardless of whether it reads the shared data or writes to the shared file.

In some embodiments, based on the acquired security information associated with the hosts 3021 and 3022, the risk assessment module 310 determines risk scores of the hosts 3021 and 3022. The risk score of each of the hosts 3021 and 3022 includes an antivirus risk score and a vulnerability risk score, wherein the antivirus risk score is determined based on acquired antivirus-related security information, and the vulnerability risk score is determined based on acquired vulnerability-related security information. In some embodiments, the risk scores of the hosts 3021 and 3022 are determined by summing the respective antivirus risk scores and vulnerability risk scores of the hosts 3021 and 3022.

In some embodiments, based on the determined risk scores of the hosts 3021 and 3022 and the risk threshold of the type of access, the risk assessment module 310 determines the access permissions of the hosts 3021 and 3022. In some embodiments, if the risk score of one of the hosts 3021 and 3022 is greater than or equal to the risk threshold of the type of access, this host is denied access to the file system 1, and conversely, the host is allowed to access the file system 1. In this manner, the assessment of access risks of a plurality of hosts 302 is realized, which avoids security problems caused by security risks of a specific host, and allows the plurality of hosts to access the storage sharing/exporting with the maximum access permissions without compromising the overall security. In addition, the process of risk assessment of the hosts is more efficient and real-time because the security states of the hosts are acquired dynamically.

Figure 4:
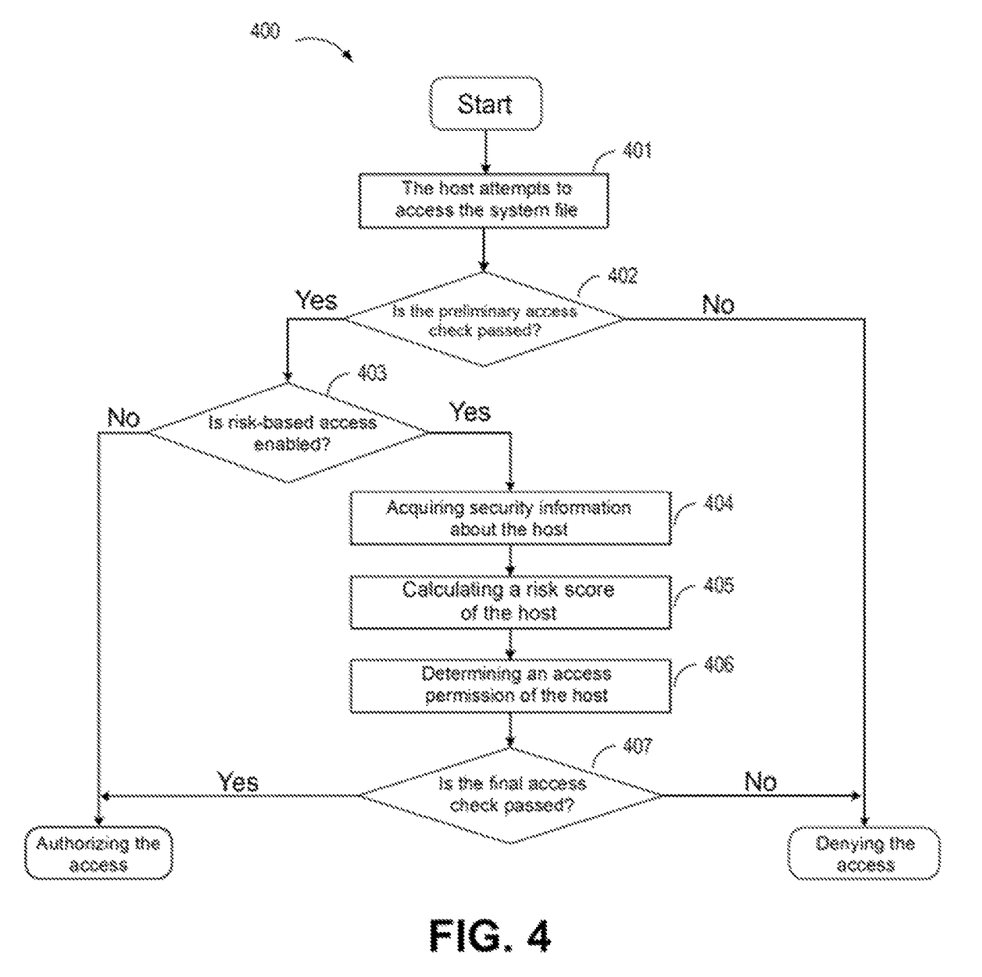
FIG. 4 illustrates a flow chart for implementing secure access of a host according to some embodiments of the present disclosure.

A flow chart for implementing secure access of a host 3021 according to some embodiments of the present disclosure is described below in conjunction with FIG. 4. The method 400 may be performed in the environment 300 of FIG. 3. Furthermore, the numbering in the flow chart does not indicate the order in which these steps are performed, and some or all of these steps may be executed in parallel, or the execution order can be interchanged, which is not limited in the present disclosure.

In 401, the host 3021 attempts to access the file system 1 in the storage server 304. In some embodiments, the host 3021 sends an access request for the file system 1 to the storage server 304, the access request including either of a read request and a write request or a combination thereof.

In 402, in response to the access request from the host 3021, the core 308 in the storage server 304 performs a preliminary access check, which is performed with respect to the access permission of the host 3021. If the access permission of the host 3021 is detected to be no access, the preliminary access check is not passed, and the host 3021 is denied access to the file system 1, and conversely, the preliminary access check is passed and the core 308 executes 403.

In 403, the core 308 calculates an overall risk score of the host 3021 to determine whether risk-based access is enabled. This calculation approach is based on conventional exporting policies and will not be described in detail herein. If the core 308 determines that risk-based access is not enabled, the host 3021 is directly authorized to access the file system 1, and conversely, the risk assessment module 310 is run and the process proceeds to 404.

In 404, the risk assessment module 310 acquires security information associated with the host 3021 from the antivirus management server 312 and the vulnerability management server 314. The security information includes risk categories, risk sub-categories, vulnerability numbers, and CVSS scores of vulnerabilities.

In 405, based on the acquired security information associated with the host 3021, the risk assessment module 310 calculates a risk score of the host 3021 and saves it locally. The process by which the risk assessment module 310 calculates the risk score is described in detail below.

In some embodiments, since the final risk score is the sum of the antivirus risk score and the vulnerability risk score, the antivirus risk score and the vulnerability risk score need to be calculated first. The antivirus risk score is obtained by summing the products of weights of antivirus risk sub-categories and counts of the antivirus risk sub-categories, and the vulnerability risk score is obtained by summing the products of weights of vulnerability risk sub-categories and the sum of the list of vulnerability risk sub-categories. As shown in Table 3, Table 3 illustrates the weights and counts/lists corresponding to different risk sub-categories. Based on the risk category matrix shown in Table 3, the risk assessment module 310 may calculate the antivirus risk score and the vulnerability risk score.

TABLE 3

Risk Category Matrix

| Risk Category | Risk Sub-category | Weight | Count/List | Type of Access Affected |
|---|---|---|---|---|
| Antivirus | No antivirus software installed | $W_{R0}$, $W_{W0}$ | 0 or 1 | RW |
|  | Real-time scanning not enabled | $W_{W1}$ | 0 or 1 | W |
|  | Definitions not up-to-date | $W_{W2}$ | 0 or 1 | W |
| Vulnerability | Elevation of permission | $W_{R3}$, $W_{W3}$ | $\Lambda_1$ | RW |
|  | Weak password | $W_{R4}$, $W_{W4}$ | $\Lambda_2$ | RW |
|  | Brute force attack | $W_{R5}$, $W_{W5}$ | $\Lambda_3$ | RW |
|  | Default credential | $W_{R6}$, $W_{W6}$ | $\Lambda_4$ | RW |
|  | Weak encryption | $W_{R7}$, $W_{W7}$ | $\Lambda_5$ | RW |
|  | Key management issues | $W_{R8}$, $W_{W8}$ | $\Lambda_6$ | RW |
|  | Man-in-the-middle (MitM) | $W_{R9}$ | $\Lambda_7$ | R |
|  | Packet sniffing | $W_{R10}$ | $\Lambda_8$ | R |
|  | Security misconfiguration | $W_{R11}$, $W_{W11}$ | $\Lambda_9$ | RW |

Note that the values of the weight column and the values of the count/list column in Table 3 are determined by the risk assessment module 310 and are not acquired from the antivirus management server 312 and the vulnerability management server 314. A value of the weight column is determined according to the degree of harm caused to storage resources by its corresponding risk sub-category, and if a risk sub-category poses a higher security risk to storage resources, it has a higher weight value. In addition, the count corresponding to an antivirus risk sub-category is determined from whether the antivirus risk sub-category exists in the host 3021, i.e., if the antivirus risk sub-category exists in the host 3021, the count has a value of 1; otherwise, the count has a value of 0. In addition, the list $\Lambda_m$ corresponding to the vulnerability risk sub-categories is a list of the products of the CVSS scores and the CVSS weight values of the vulnerabilities. As shown in Table 4, Table 4 illustrates the severity rating table for specific vulnerability risk sub-categories.

TABLE 4

Severity Rating Table

| Rating | CVSS Score | CVSS Weight |
|---|---|---|
| None | 0 | 0 |
| Low | 0.1-3.9 | $S_L$ |
| Medium | 4.0-6.9 | $S_M$ |
| High | 7.0-8.9 | $S_H$ |
| Critical | 9.0-10.0 | $S_C$ |

In Table 4, the CVSS ratings and scores are the industry standard for vulnerabilities, and the CVSS weights are determined based on the CVSS ratings and are designed to accurately assess the risk level of each vulnerability in this solution. For example, if the vulnerability risk sub-category "Elevation of permission" has four vulnerabilities, and the CVSS scores of the vulnerabilities are 7, 10, 9.8, and 3, respectively, the list $\Lambda_1$ for "Elevation of Permission" is $[7*S_H, 10*S_C, 9.8*S_C, 3*S_L]$.

In some embodiments, based on the risk category matrix, the risk assessment module 310 calculates an antivirus risk score $E_A$ by the following expression:

$$E_A = [\emptyset_R[0:n-1]*\Theta^T, \emptyset_W[0:n-1]*\Theta^T] \quad (1)$$

where $\Theta^T$ is the transpose of the list $\Theta$ of risk score assessments for the antivirus risk sub-categories, and $\Theta$ is expressed as $$\Theta = [\theta_0, \theta_1, \ldots, \theta_{n-1}] \quad (2)$$

where $\theta_{n-1}$ is the risk score assessment for the nth antivirus risk sub-category of the antivirus risk category. Here, $\emptyset_R$ is a list of weights of the risk sub-categories with respect to read operations, and is expressed as $$\emptyset_R = [W_{R0}, 0, 0, W_{Rn}, \ldots, W_{R[n+m-1]}] \quad (3)$$

$\emptyset_R[0:n-1]$ represents a list of weights of the antivirus risk sub-categories with respect to read operations, and $\emptyset_R[n:n+m-1]$ represents a list of weights of the vulnerability risk sub-categories with respect to read operations, where a weight of 0 for a risk sub-category means that this risk sub-category has no effect on read operations. Here, $\emptyset_W$ is a list of weights of the risk sub-categories with respect to write operations, and is expressed as $$\emptyset_W = [W_{W0}, 0, 0, W_{Wn}, \ldots, W_{W[n+m-1]}] \quad (4)$$

where $\emptyset_W[0:n-1]$ represents a list of weights of the antivirus risk sub-categories with respect to write operations, and $\emptyset_W[n:n+m-1]$ represents a list of weights of the vulnerability risk sub-categories with respect to write operations, where a weight of 0 for a risk sub-category means that this risk sub-category has no effect on write operations.

The risk assessment module 310 calculates a vulnerability risk score $E_V$ by using the following expression:

$$E_V = [\emptyset_R[n:n+m-1]*\Omega^T, \emptyset_W[n:n+m-1]*\Omega^T] \quad (5)$$

Where $\Omega^T$ is the transpose of the list $\Omega$ of risk score assessments for the vulnerability risk sub-categories, and $\Omega$ is expressed as $$\Omega = [r_0, r_1, \ldots, r_{m-1}] \quad (6)$$

where $r_{m-1}$ is the risk score assessment for the mth vulnerability risk sub-category in the vulnerability risk category, which is expressed as $$r_{m-1} = \text{sum}(\Lambda_m) \quad (7)$$

In some embodiments, the risk assessment module 310 calculates a risk score $E_C$ of the host 3021 by the following expression:

$$E_C = E_A + E_V \quad (8)$$

wherein $E_C[0]$ is a risk score for a read operation of the host 3021, and $E_C[1]$ is a risk score for a write operation of the host 3021.

In 406, based on a comparison between the calculated risk score of the host 3021 with a risk threshold of the type of access, the risk assessment module 310 determines the access permission of the host 3021. As shown in Table 4, Table 4 illustrates a default mapping matrix of types of access and their risk thresholds, where the mapping matrix will be in effect when the solution proposed in this disclosure is enabled. A storage administrator may also modify the risk thresholds as desired. If the risk score of the host 3021 is greater than or equal to the risk threshold of the type of access, the host 3021 does not have permission to access the file system 1, or if the risk score of the host 3021 is less than the risk threshold of the type of access, the host 3021 has permission to access the file system 1.

TABLE 5

Mapping Matrix of Types of Access and Risk Thresholds

| Type of Access | Risk Threshold |
|---|---|
| Read | T1 |
| Write | T2 |

In 407, the core 308 judges whether the final check for the host 3021 passes or not based on the access permission of the host 3021 determined by the risk assessment module 310. If the host 3021 does not have the permission to access the file system 1, the host 3021 is denied access to the file system 1; otherwise, the host 3021 is authorized to access the file system 1.

As an example, the customized access permission of the host 3021 is "read/write," so in existing host access solutions, the host 3021 has read and write permissions to the storage exporting/sharing of the storage server 304. However, in the solution presented in this disclosure, the final access permission is determined by the risk score of the host 3021. If the read risk score calculated by the risk assessment module 310 in the storage server 304 is greater than the threshold T1, read access is denied. The same is true for write access.

Figure 5:
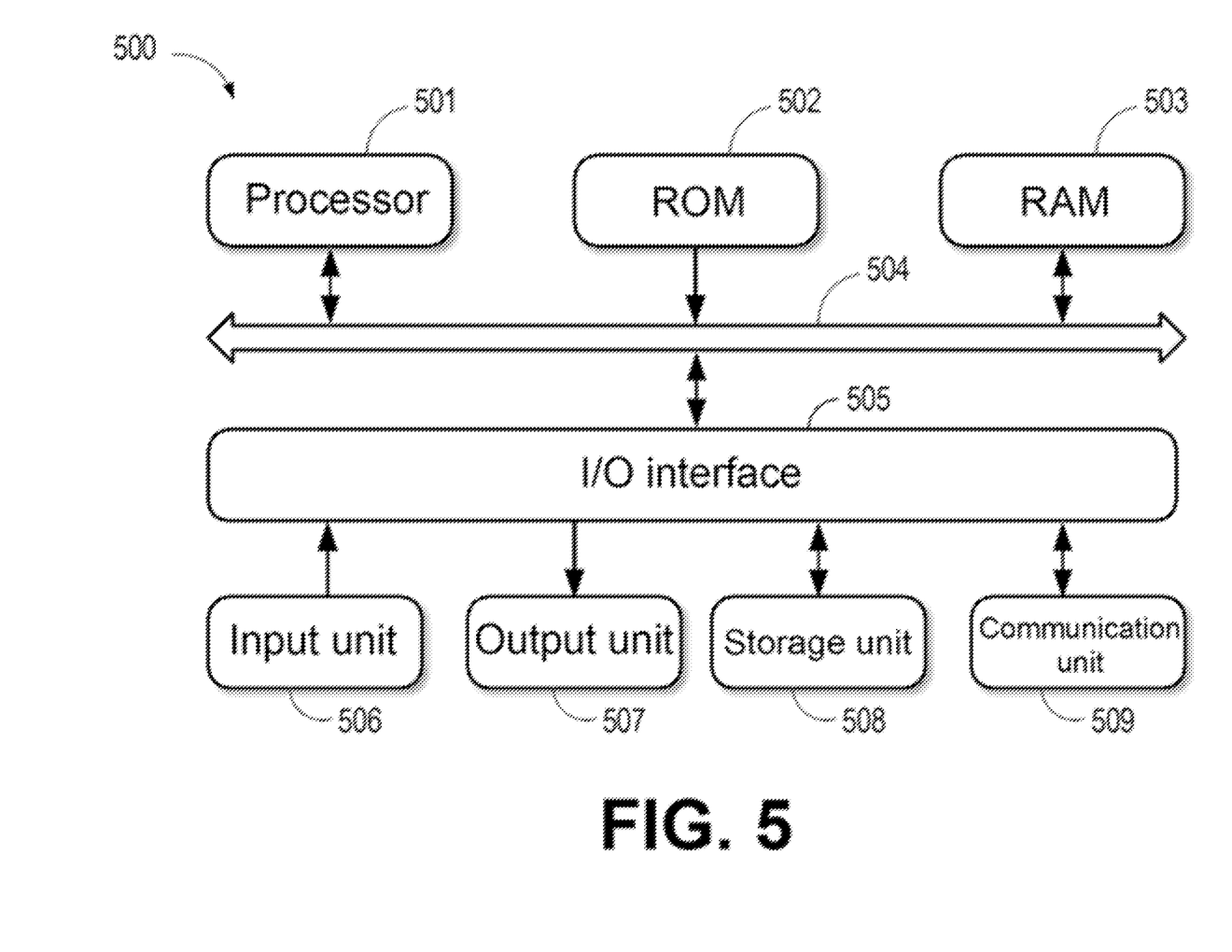
FIG. 5 illustrates a schematic block diagram of an example device suitable for implementing embodiments of the present disclosure.

FIG. 5 illustrates a schematic block diagram of an example device 500 which can be used to implement embodiments of the present disclosure. As shown in the figure, the electronic device 500 includes a processor 501 that can execute various appropriate actions and processing according to computer program instructions stored in a read-only memory (ROM) 502 or computer program instructions loaded from a storage unit 508 into a random access memory (RAM) 503. Various programs and data required for operation of the device 500 may also be stored in the RAM 503. The processor 501, the ROM 502, and the RAM 503 are connected to each other via a bus 504. An input/output (I/O) interface 505 is also connected to the bus 504.

A plurality of components in the device 500 are connected to the I/O interface 505, including: an input unit 506, such as a keyboard, a mouse, or the like; an output unit 507, such as various types of displays, speakers, or the like; the storage unit 508, such as a disk, a CD-ROM, or the like; and a communication unit 509, such as a network card, a modem, a wireless communication transceiver, or the like. The communication unit 509 allows the device 500 to exchange information/data with other devices via a computer network, such as the Internet, and/or various telecommunication networks.

The processor 501 may be a variety of general-purpose and/or specialized processing components with processing and computing capabilities. Some examples of the processor 501 include, but are not limited to, central processing units (CPUs), graphics processing units (GPUs), various specialized artificial intelligence (AI) computing chips, various processors running machine learning model algorithms, digital signal processors (DSPs), and any suitable processors, controllers, microcontrollers, or the like. The processor 501 performs the various methods and processing described above, such as the method 200. For example, in some embodiments, the method 200 may be implemented as a computer software program that is tangibly included in a machine-readable medium, such as the storage unit 508. In some embodiments, part or all of the computer program may be loaded and/or installed onto the device 500 via the ROM 502 and/or the communication unit 509. When the computer program is loaded into the RAM 503 and executed by the processor 501, one or more steps of the method 200 described above may be performed. Alternatively, in other embodiments, the processor 501 may be configured to perform the method 200 by any other suitable means (e.g., with the aid of firmware).

The functions described hereinabove may be performed at least in part by one or more hardware logic components. For example, without limitation, example types of available hardware logic components include: a Field Programmable Gate Array (FPGA), an Application Specific Integrated Circuit (ASIC), an Application Specific Standard Product (ASSP), a System on Chip (SOC), a Load Programmable Logic Device (CPLD), and the like.

Program code for implementing the method of the present disclosure may be written by using one programming language or any combination of a plurality of programming languages. The program code may be provided to a processor or controller of a general purpose computer, a special purpose computer, or another programmable data processing apparatus, such that the program code, when executed by the processor or controller, implements the functions/operations specified in the flow charts and/or block diagrams. The program code can be completely executed on a machine, partially executed on a machine, partially executed on a machine as an independent software package and partially executed on a remote machine, or completely executed on a remote machine or a server.

In the context of the present disclosure, a machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above content. More specific examples of the machine-readable storage medium may include one or more wire-based electrical connections, a portable computer diskette, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combinations thereof. Additionally, although operations are depicted in a particular order, this should be understood that such operations are required to be performed in the particular order shown or in a sequential order, or that all illustrated operations should be performed to achieve desirable results. Under certain environments, multitasking and parallel processing may be advantageous. Likewise, although the above discussion contains several specific implementation details, these should not be construed as limitations to the scope of the present disclosure. Certain features that are described in the context of separate embodiments may also be implemented in combination in a single implementation. Conversely, various features that are described in the context of a single implementation may also be implemented in a plurality of implementations separately or in any suitable sub-combination.

Although the present subject matter has been described using a language specific to structural features and/or method logical actions, it should be understood that the subject matter defined in the appended claims is not necessarily limited to the particular features or actions described above. Rather, the specific features and actions described above are merely example forms of implementing the claims.

What is claimed is:

1. A method, comprising:
   performing, by a storage server comprising at least one processor, an access check in response to receiving an access request from a host;
   checking, by the storage server, whether risk-based access is enabled in response to passing the access check;
   acquiring, by the storage server, security information associated with the host from a management server in response to detecting that the risk-based access is enabled;
   determining, by the storage server, an antivirus risk score according to antivirus-related security information;
   determining, by the storage server, a vulnerability risk score according to vulnerability-related security information;
   determining, by the storage server, a risk score of the host based on the antivirus risk score and the vulnerability-related security information; and
   determining, by the storage server, an access permission of the host based on the risk score of the host and a risk threshold of a type of access associated with the access request.

2. The method according to claim 1, wherein acquiring the security information associated with the host from the management server comprises:
   receiving, from an antivirus management server, the antivirus-related security information collected by the antivirus management server from antivirus client software installed on the host; and
   receiving, from a vulnerability management server, the vulnerability-related security information collected by the vulnerability management server from vulnerability client software installed on the host.

3. The method according to claim 1, wherein determining the antivirus risk score comprises:
   determining risk scores of antivirus risk sub-categories according to respective weights of the antivirus risk sub-categories and respective counts of the antivirus risk sub-categories; and
   determining the antivirus risk score according to the risk scores of the antivirus risk sub-categories.

4. The method according to claim 3, wherein the respective weights of the antivirus risk sub-categories are defined according to respective degrees of harm of the antivirus risk sub-categories to storage.

5. The method according to claim 3, wherein a value of a count of a antivirus risk sub-category is a first value or a second value, wherein the value of the count being the first value corresponds to a presence of the antivirus risk sub-category, and the value of the count being the second value corresponds to an absence of the antivirus risk sub-category.

6. The method according to claim 1, wherein determining the vulnerability risk score comprises:
   determining risk scores of vulnerability risk sub-categories according to respective weights of the vulnerability risk sub-categories and a list of the vulnerability risk sub-categories; and
   determining the vulnerability risk score according to the risk scores of the vulnerability risk sub-categories.

7. The method according to claim 6, wherein the respective weights of the vulnerability risk sub-categories are defined according to respective degrees of harm of the vulnerability risk sub-categories to storage.

8. The method according to claim 1, wherein determining the access permission of the host comprises:
   denying the access permission of the host in response to the risk score of the host being determined to be greater than or equal to the risk threshold of the type of access; or
   granting the access permission of the host in response to the risk score of the host being determined to be less than the risk threshold of the type of access.

9. The method according to claim 1, wherein the access permission of the host comprises the host being capable of accessing a file system in the storage server.

10. A storage server, comprising:
    at least one processor; and
    at least one memory coupled to the at least one processor and having instructions stored thereon, wherein the instructions, when executed by the at least one processor, cause the device to perform actions, comprising:

performing an access check in response to receiving an access request from a host;

checking whether risk-based access is enabled in response to passing the access check;

acquiring security information associated with the host from a management server in response to detecting that the risk-based access is enabled;

determining an antivirus risk score according to antivirus-related security information;

determining a vulnerability risk score according to vulnerability-related security information;

determining a risk score of the host based on the antivirus risk score and the vulnerability risk score; and determining an access permission of the host based on the risk score of the host and a risk threshold of corresponding to a type of access associated with the access request.

11. The storage server according to claim 10, wherein acquiring the security information associated with the host from the management server comprises:

receiving, from an antivirus management server, the antivirus-related security information collected by the antivirus management server from antivirus client software installed on the host; and receiving, from a vulnerability management server, the vulnerability-related security information collected by the vulnerability management server from vulnerability client software installed on the host.

12. The storage server according to claim 10, wherein determining the antivirus risk score comprises:

determining risk scores of antivirus risk sub-categories according to weights of the antivirus risk sub-categories and counts of the antivirus risk sub-categories; and determining the antivirus risk score according to the risk scores of the antivirus risk sub-categories.

13. The storage server according to claim 10, wherein determining the vulnerability risk score comprises:

determining risk scores of vulnerability risk sub-categories according to weights of the vulnerability risk sub-categories and a list of the vulnerability risk sub-categories; and determining the vulnerability risk score according to the risk scores of the vulnerability risk sub-categories.

14. The storage server according to claim 10, wherein determining the access permission of the host comprises:

denying the access permission of the host in response to the risk score of the host being greater than or equal to the risk threshold of the type of access; or granting the access permission of the host in response to the risk score of the host being less than the risk threshold of the type of access.

15. A computer program product, the computer program product being stored on a non-transitory computer-readable medium and comprising machine-executable instructions, wherein the machine-executable instructions, when executed, cause a storage server to perform operations, comprising:

performing an access check in response to receiving an access request from a host;

checking whether risk-based access is enabled in response to passing the access check;

acquiring security information associated with the host from a management server in response to detecting that the risk-based access is enabled;

determining an antivirus risk score according to antivirus-related security information;

determining a vulnerability risk score according to vulnerability-related security information;

determining a risk score of the host based on the antivirus risk score and the vulnerability risk score; and determining an access permission of the host based on the risk score of the host and a risk threshold of the type of access.

16. The computer program product according to claim 15, wherein determining the antivirus risk score comprises:

determining risk scores of antivirus risk sub-categories according to respective weights of the antivirus risk sub-categories and respective counts of the antivirus risk sub-categories; and determining the antivirus risk score according to the risk scores of the antivirus risk sub-categories.

17. The computer program product according to claim 16, wherein the respective weights of the antivirus risk sub-categories are defined according to respective degrees of harm of the antivirus risk sub-categories to storage.

18. The computer program product according to claim 16, wherein a value of a count of a antivirus risk sub-category is a first value or a second value, wherein the value of the count being the first value corresponds to a presence of the antivirus risk sub-category, and the value of the count being the second value corresponds to an absence of the antivirus risk sub-category.

19. The computer program product according to claim 15, wherein determining the vulnerability risk score comprises:

determining risk scores of vulnerability risk sub-categories according to respective weights of the vulnerability risk sub-categories and a list of the vulnerability risk sub-categories; and determining the vulnerability risk score according to the risk scores of the vulnerability risk sub-categories, wherein the respective weights of the vulnerability risk sub-categories are defined according to respective degrees of harm of the vulnerability risk sub-categories to storage.

20. The computer program product according to claim 15, wherein determining the access permission of the host comprises:

denying the access permission of the host in response to the risk score of the host being determined to be greater than or equal to the risk threshold of the type of access; or granting the access permission of the host in response to the risk score of the host being determined to be less than the risk threshold of the type of access.

* * * * *